United States Patent
Nakamura et al.

(10) Patent No.: US 7,031,582 B2
(45) Date of Patent: Apr. 18, 2006

(54) OPTICAL FIBER CABLE AND OPTICAL FIBER CABLE WITH PLUG

(75) Inventors: Kazuki Nakamura, Tokyo (JP); Takeshi Kitayama, Nei-gun (JP); Takara Yamamoto, Toyama (JP); Hiroe Kubo, Toyama (JP); Yoshimi Kamimura, Toyama (JP); Jun Okumura, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/168,397

(22) PCT Filed: Dec. 25, 2000

(86) PCT No.: PCT/JP00/09187

§ 371 (c)(1),
(2), (4) Date: Jun. 21, 2002

(87) PCT Pub. No.: WO01/51977

PCT Pub. Date: Jul. 19, 2001

(65) Prior Publication Data

US 2003/0044136 A1 Mar. 6, 2003

(51) Int. Cl.
*G02B 6/44* (2006.01)

(52) U.S. Cl. .................................. 385/128; 385/141
(58) Field of Classification Search ......... 385/123–128, 385/141; 174/121 A
See application file for complete search history.

(56) References Cited

U.S. PATENT DOCUMENTS

| | | | |
|---|---|---|---|
| 4,469,401 A | | 9/1984 | Yamazaki et al. |
| 4,511,694 A | * | 4/1985 | Kramer et al. ............. 525/54.1 |
| 4,642,265 A | | 2/1987 | Suzuki |
| 4,762,392 A | * | 8/1988 | Yamamoto et al. ......... 385/128 |
| 4,799,762 A | | 1/1989 | Kakuta et al. |
| 5,352,712 A | | 10/1994 | Shustack |
| 5,408,561 A | * | 4/1995 | McCallum et al. ......... 385/109 |
| 6,114,036 A | * | 9/2000 | Rinehart et al. ............ 428/383 |
| 6,298,188 B1 | * | 10/2001 | Chapin et al. .............. 385/123 |

FOREIGN PATENT DOCUMENTS

| | | | |
|---|---|---|---|
| EP | 0249226 A | | 12/1987 |
| EP | 0631538 B | | 5/1996 |
| EP | 0 631 538 | * | 5/1996 |
| JP | 58-28802 | | 8/1956 |
| JP | 58-142305 | | 8/1983 |
| JP | 58-194762 | | 11/1983 |
| JP | 61-185708 | * | 8/1986 |
| JP | 61-196211 | | 8/1986 |
| JP | 61-251807 | * | 11/1986 |
| JP | 61251807 A | | 11/1986 |
| JP | 03054252 A | | 12/1987 |
| JP | 61185708 A | | 8/1990 |
| JP | 7-77642 | | 3/1995 |
| JP | 10-307218 | | 11/1998 |
| JP | 10-319281 | | 12/1998 |
| JP | 10-332995 | | 12/1998 |
| JP | 10-332996 | | 12/1998 |
| JP | 10-332997 | * | 12/1998 |
| JP | 10332997 A | | 12/1998 |
| JP | 11-242142 | | 9/1999 |
| JP | 2001-515223 | | 9/2001 |
| WO | WO 99/12063 | | 3/1999 |

* cited by examiner

*Primary Examiner*—John R. Lee
*Assistant Examiner*—Christopher M. Kalivoda
(74) *Attorney, Agent, or Firm*—Fitch Even Tabin & Flannery

(57) ABSTRACT

Disclosed are an optical fiber cable comprising an optical fiber and at least one covering layer formed on the outer periphery of the optical fiber, at least one layer of the covering layer being made of a material comprising a resin component containing a polyamide polymer, wherein a flexural modulus E upon displacement of 1 mm is within a range from 2 to 15 (N/mm) and the optical fiber cable passes a flame resistance test in accordance with DIN 72551-5, and an optical fiber cable with a plug using the optical fiber. Therefore, they have excellent flame resistance and good handling properties.

23 Claims, 3 Drawing Sheets

OPTICAL FIBER CABLE AND OPTICAL FIBER CABLE WITH PLUG

CROSS-REFERENCE APPLICATIONS

This application is a 371 National phase of International Application PCT/JP00/09187, filed Dec. 25, 2000, which designated the U.S. and that International Application was not published under PCT Article 21(2) in English.

TECHNICAL FIELD

The present invention relates to an optical fiber cable and an optical fiber cable with plug, which are used in wiring of transmission of light signals, computer connection wiring for high-speed optical communication, wiring in the vicinity of switchboards, wiring for controlling automatic machines of factories, wiring for transmitting data for moving bodies such as automobile, and wiring for optical sensors.

This application is based on Japanese Patent Application (Japanese Patent Application No. Hei 11-366357) filed in Japan, the content of which is incorporated herein by reference.

BACKGROUND ART

A plastic optical fiber (hereinafter merely referred to as an "optical fiber") has already been put into practical use in applications such as short-distance data communication and sensing. It that case, an optical fiber is rarely used alone. The optical fiber is often used in the form of an optical fiber cable after protecting whose outer periphery is protected with a covering layer.

To enhance the heat resistance and the durability to chemicals of such an optical fiber cable, techniques of using a polyamide polymer as the covering layer are proposed in Japanese Unexamined Patent Application, First Publication No. Hei 10-319281, Japanese Unexamined Patent Application, First Publication No. Hei 11-242142, Japanese Unexamined Patent Application, First Publication No. Hei 10-332995, and Japanese Unexamined Patent Application, First Publication No. Hei 10-307218.

With respect to the optical fiber cable used within doors such as automobiles and factories, flame resistance is required. To reduce a toxic gas evolved during combustion, there is required an optical fiber cable which is free from halogen and is also superior in flame resistance. In "Polyamide Resin Handbook" (published by THE NIKKAN KOGYO SHIMBUN, LTD., written by Osamu FUKUMOTO), a technique of mixing a triazine compound, especially melamine or melamine cyanurate, with a polyamide polymer is proposed.

However, an optical fiber cable using the polyamide polymer as the covering layer had such drawbacks that the flexural modulus is high, winding tendency remains when stored in the state of being wound around a bobbin or the like, and the handling property is poor when formed into an optical fiber cable assembly such as wire harness and an optical fiber cable with a plug. Furthermore, when the triazine compound is introduced into the polyamide polymer to enhance the flame resistance, the flexural modulus is further increased and the handling property is especially poor.

DISCLOSURE OF THE INVENTION

An object of the present invention is to provide an optical fiber cable which has excellent flame resistance and good handling property, and an optical fiber cable with a plug, using this optical fiber cable.

The optical fiber cable of the present invention comprises an optical fiber and at least one covering layer formed on the outer periphery of the optical fiber, at least one layer of the covering layer being made of a material comprising a resin component containing a polyamide polymer, wherein a flexural modulus E upon displacement of 1 mm is within a range from 2 to 15 (N/mm) and the optical fiber cable passes a flame resistance test in accordance with DIN 72551-5.

BEST MODE FOR CARRYING OUT THE INVENTION

The present invention will now be described in detail.

Figure 1:
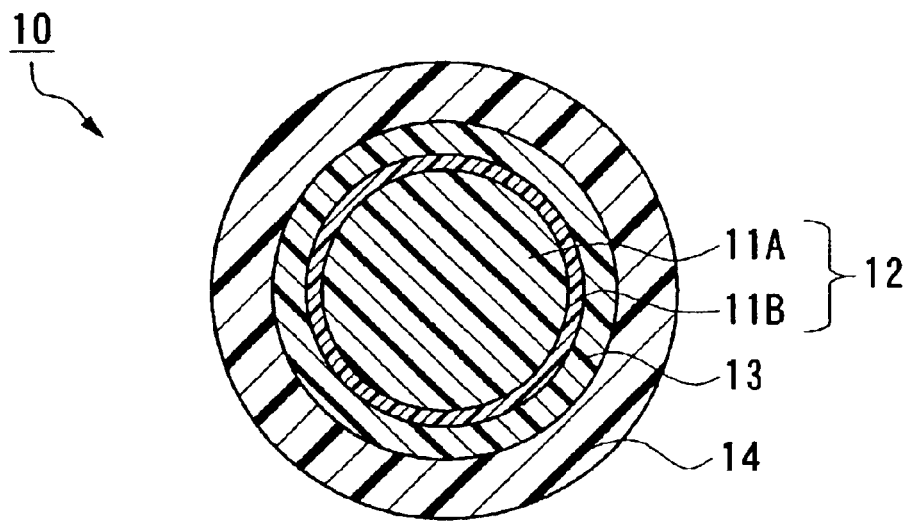
FIG. 1 is a cross-sectional view showing one example of an optical fiber cable of the present invention.
Figure 2:
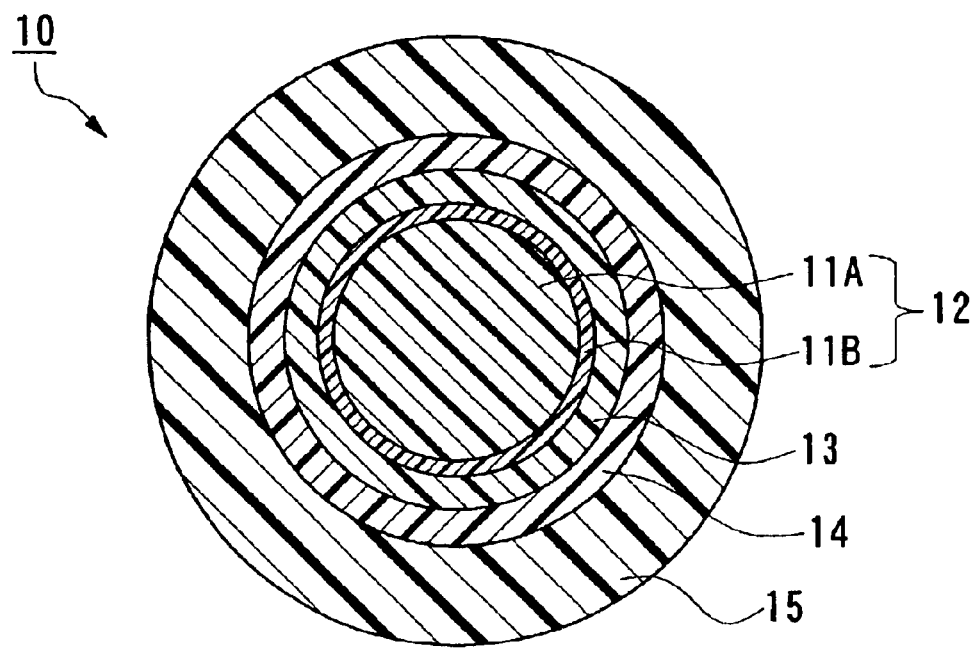
FIG. 2 is a cross-sectional view showing another example of an optical fiber cable of the present invention.

The optical fiber cable of the present invention comprises an optical fiber and at least one covering layer formed on the outer periphery of the optical fiber, at least one layer of the covering layer being made of a material comprising a resin component containing a polyamide polymer. FIG. 1 and FIG. 2 each is a cross-sectional view showing one embodiment of optical fiber cable 10 of the present invention and, in FIG. 1, primary covering layer 13 and secondary covering layer 14 are formed in order on the outer periphery of optical fiber 12 composed of core 11A and clad 11B, while tertiary covering layer 15 is further formed in FIG. 2.

As optical fiber 12, those having a publicly known structure are used, and examples thereof include SI type optical fiber having a core-clad structure shown in FIG. 1, GI type optical fiber wherein the refractive index of core 11A is gradually reduced from the center to the outer periphery, multi-layer optical fiber wherein the refractive index of core 11A is reduced stepwise from the center to the outer periphery, and multi-core optical fiber having one optical fiber 12 and a plurality of cores 11A. To effect high-speed transmission of signals by band widening of optical fiber 12, the multi-layer optical fiber is preferably used. There can be used an optical fiber produced by further covering the outer periphery of the GI type optical fiber or the multi-layer optical fiber with clad 11B.

As the core material, various polymers having high transparency used in a publicly known optical fiber 12 are used and a methyl methacrylate polymer is preferably used. More preferred are a methyl methacrylate homopolymer, a copolymer containing a methyl methacrylate unit as the main component, a copolymer containing a benzyl methacrylate unit as the main component, and a fluorinated alkyl methacrylate polymer. Among these copolymers, the methyl methacrylate homopolymer is particularly preferred.

As the clad material, publicly known materials having a lower refractive index than that of the core material are used, and a copolymer of a fluorinated alkyl (meth)acrylate unit and a methyl methacrylate unit, a polymer made of an α-fluoroacrylate ester, a polymer containing a fluorinated vinylidene unit, and a blend made of various polymers described above are preferred. As the polymer containing a fluorinated vinylidene unit, for example, copolymers made of a homopolymer of vinylidene fluoride or a fluorinated vinylidene unit and each monomer unit of tetrafluoroethylene, propylene hexafluoride, acetone hexafluoride, ethylene or propylene are preferably used. Those having a protective layer on the outer periphery of these optical fibers 12 are preferably used because the quantity of light, which can be incorporated into optical fiber 12, can be increased.

As used herein, the term "protective layer" refers to a light permeable layer, which is a layer to be conjugated as the outermost layer of optical fiber 12, capable of contributing to reflection and refraction of light when light is transmitted by optical fiber 12. It is preferred that the protective layer is fused in the production of core 11A or clad 11B of the inner layer and optical fiber 12 and is substantially integrated, and thus the layers uniformly adhere closely with each other.

As the material of the protective layer, publicly known materials are used similar to the clad material, and examples thereof include a copolymer made of each monomer unit of (meth)acrylate having a short-chain fluorinated alkyl group, (meth)acrylate having a long-chain fluorinated alkyl group and methyl methacrylate used in a conventional optical fiber 12 having a high opening angle, and a vinylidene fluoride polymer. Among these materials, the vinylidene fluoride polymer is preferably used in view of the flexibility and solvent resistance.

As the vinylidene fluoride polymer, a homopolymer of vinylidene fluoride and a copolymer made of a fluorinated vinylidene unit and each unit of tetrafluoroethylene, propylene hexafluoride, acetone hexafluoride, ethylene or propylene is preferably used. When using a copolymer made of a fluorinated vinylidene unit and a tetrafluoroethylene unit, a copolymer containing 70 to 90% by mol of the fluorinated vinylidene unit is preferred because of high transparency. To reduce a bending loss of optical fiber 12, a light permeable material having a small refractive index is used more preferably than a material constituting a clad material as the material of the protective layer. The use of such a protective layer as an outer-most layer of optical fiber 12 makes it possible to increase the peel strength between primary covering layer 13 and optical fiber 12.

Such an optical fiber 12 can be produced by publicly known methods such as melt-spinning method.

When using optical fiber cable 10 of the present invention in the environment of high temperature of 70 to 80° C. or the environment with extremes of temperature, an optical fiber having a small thermal shrinkage ratio is used as optical fiber 12 in order to inhibit pistoning, and optical fiber 12, which exhibits a shrinkage ratio of 0 to 0.5% when heated under dry heat environment at 90° C. for 50 hours, is used more preferably. Such optical fiber 12 having a small thermal shrinkage ratio can be obtained by, for example, a heat treatment of optical fiber 12. This heat treatment can be effected continuously or batch-wise, but is preferably effected batch-wise at the temperature, which meets the following expression:

$$T_g-30 \leq T < T_g$$

where Tg denotes a glass transition initiation temperature as measured in accordance with JIS K 7121-1987 of the core material of optical fiber 12, and T denotes a heat treatment temperature, within 100 hours.

The outer diameter of optical fiber 12 is preferably 600 μm or more, and more preferably 900 μm or more, in order to facilitate positioning when the optical fiber 12 is connected with a light source. It is preferably 1300 μm or less in order to further improve the flexibility and the handling property.

In optical fiber cable 10 of the present invention, at least one layer of one or more covering layers formed on the outer periphery of optical fiber 12 is made of a material comprising a resin component containing a polyamide polymer.

As the polyamide polymer, a polyamide elastomer, a polyamide copolymer composed of plural kinds of polyamide units, and mixtures thereof are preferably used. Examples of the polyamide elastomer include those, which use a monomer unit constituting polytetramethylene ether glycol, polypropylene glycol or aliphatic polyester diol as a soft segment and use a monomer unit constituting polyamide 12 or polyamide 6 as a hard segment. Among these, a copolymer made of a monomer unit of polytetramethylene ether glycol and polyamide 12 each having high versatility and low cost.

As the polyamide copolymer composed of plural kinds of polyamide units, binary to quaternary copolymers made of a monomer unit selected from polyamide 10, polyamide 11, polyamide 12, polyamide 6 and polyamide 66 are used. Among these copolymers, a copolymer made of a monomer unit of polyamide 12 and polyamide 6 is preferred because the copolymer often has a low melting point of 180° C. or lower and is less likely to cause heat damage of optical fiber 12 when the covering layer is formed on optical fiber 12.

These polyamide copolymers can also be used in combination and examples of the combination include polyamide 11 or polyamide 12 and a polyamide elastomer, and polyamide 11 or polyamide 12 and a polyamide copolymer.

As the resin component containing a polyamide polymer, mixtures of the polyamide polymer and the other resin can also be used. Examples of the mixture include mixture of polyamide 11 or polyamide 12 and polyolefin. As the polyolefin, for example, polyethylene, polypropylene and ethylene/propylene rubber are used. As the polyolefin, those obtained by the graft polymerization of the polyolefin and an organic acid or an organic acid anhydride are preferably used because the mixing property and dispersibility of the polyamide polymer and the polyolefin is improved and the impact resistance is excellent. When using the mixture of polyamide 11 or polyamide 12 and the polyolefin, the amount of polyamide 11 or polyamide 12 in the mixture is preferably within a range from 50 to 95% by weight and the amount of the polyolefin is preferably within a range from 5 to 50% by weight, because the impact resistance can be improved without drastically impairing high heat resistance of the polyamide.

Particularly, polyamide 11 is superior to polyamide 12 used generally in the covering layer to mechanical properties (e.g. impact resistance at low temperature, bending fatigue resistance, tensile breakage elongation, and flexural modulus), wear resistance, linear expansion coefficient, and gas permeability. Therefore, when using polyamide 11 as the polyamide polymer, it is possible to obtain optical fiber cable 10 which is more flexible and superior in flexibility as compared with the case of using polyamide 12, and causes less deterioration due to pistoning and transmission properties under the environment of high temperature. When using the resin component containing polyamide 12 in the covering layer, crystallization of the polyamide proceeds after the formation of the covering layer and, therefore, the cable is likely to become hard gradually. Polyamide 11 having a melting point which is about 10° C. higher than that of polyamide 12 is preferably used, because optical fiber cable 10 is not hardened at the temperature of about 80° C. as an upper limit of the service temperature of optical fiber 12 using PMMA in the core material.

In order to prevent winding tendency by reducing the flexural modulus of optical fiber cable 10, and to facilitate the handling property of optical fiber cable 10 by imparting a restoring force when deformed and the form stability to optical fiber cable 10, the flexural modulus as measured in accordance with ASTM D790 of the resin component used in at least one layer of the covering layer is preferably within a range from 40 to 1200 MPa, and more preferably from 80 to 1000 MPa. When the flexural modulus of the resin component is less than 40 MPa, the form stability and the form restoring force when deformed sometimes become insufficient. On the other hand, when the flexural modulus exceeds 1200 MPa, the flexibility is lowered and the handling property is sometimes lowered.

Optical fiber cable 10 of the present invention has at least one covering layer made of a material comprising a resin component containing a polyamide polymer and, furthermore, the optical fiber cable has a flexural modulus E upon displacement of 1 mm within a range from 2 to 15 (N/mm) and also passes a flame resistance test in accordance with DIN 72551-5. The flexural modulus E is preferably 5 N/mm or more and 13 N/mm or less.

Optical fiber cable 10 having a flexural modulus of less than 2 N/mm is not easily handled because of late restoration when deformed and poor form stability. In optical fiber cable 10 having a flexural modulus of more than 15 N/mm, the flexibility is lowered and winding tendency is likely to be imparted and, therefore, the handling property becomes worse. On the other hand, when the flexural modulus is within a range from 2 to 15 N/mm, the restoring force is appropriately high when deformed and the form is appropriately stable and, furthermore, the flexibility is good and winding tendency is not easily imparted. Therefore, the handling property is excellent.

The flame resistance test as measured an accordance with DIN72551-5 in the present Invention refers to a test wherein DIN 72551-5, which defines the method of measuring the flame resistance for electric wire, is slightly changed, as described hearing below, in order to measure the flame resistance of the optical fiber cable. In this measuring method, it is necessary to maintain electric wire during or after combustion an oblique angle of 45°. However, unlike optical fiber cable 10, it is difficult to maintain optical fiber cable 10 at an oblique angle of 45° when optical fiber 12 is combusted. Therefore, the flame resistance is measured in the state where a pair of copper wires are spirally wound on the periphery of optical fiber cable 10 so that the copper wires are intersected with each other, in order to maintain optical fiber cable 10 during or after combustion at an oblique angle of 45°. The copper wire having a diameter of 0.7 mm φ is used and a spiral cycle is set to 20mm in the longitudinal direction of optical fiber cable 10. With respect to criteria for the results of the flame resistance test, samples wherein a fire was extinguished after within 3D seconds after the optical fiber 12 became on fire and keeping away from fire were rated "pass", while samples wherein fare was not extinguished after the optical fiber 10 was on fire and keeping away from my horn fire were rated "failed".

To impart the flame resistance to optical fiber cable 10, the material constituting the covering layer preferably contains not only the resin component containing the polyamide polymer, but also a flame retardant.

Examples of the flame retardant include various metal hydroxides, phosphorus compound and triazine compound. Among these, the triazine compound is preferably used because of large effect of improving the flame resistance of the polyamide polymer, and melamine cyanurate is more preferred. The triazine compound is preferably mixed in the amount within a range from 8 to 60 parts by weight, more preferably 10 to 60 parts by weight, and still more preferably from 11 to 25 parts by weight, based on 100 parts by weight of the resin component. When the amount of the triazine compound is less than 8 parts by weight, the effect of improving the flame resistance is likely to become poor. On the other hand, when the amount exceeds 60 pans by weight, the flexural modulus of the material constituting the covering layer increased too much and the handling property of optical fiber cable 10 is likely to become poor.

Optical fiber cable 10 of the present invention has a flexural modulus E upon displacement of 1 mm within a range from 2 to 15 (N/mm) and also passes a flame resistance test in accordance with DIN 72551-5, and also is superior in handling property and has the flame resistance.

In optical fiber cable 10 of the present invention, one or two covering layers may be formed on the outer periphery of optical fiber 12. Two or more covering layers are preferably formed because different functions are imparted to each covering layer and are easily imparted plural functions that can not be achieved by one covering layer, and as a result, for example, optical fiber cable 10 having both flame resistance and flexibility can be easily obtained.

When the flame resistance is imparted to the optical fiber cable 10, as described above, it is effective to mix the flame retardant with the material constituting the covering layer. In general, the mixture of the resin component and the flame retardant is harder than the resin component, which is not mixed with the flame retardant, and the flexural modulus increases. Therefore, when plural covering layers are formed on optical fiber 12, it becomes necessary to mix the flame retardant taking account of the flexural modulus of the resin component used.

In optical fiber cable 10 comprising the covering layer containing the flame retardant and the covering layer containing no flame retardant, when a difference in flexural modulus between the covering layer containing the flame retardant and the covering layer containing no flame retardant is too large, mechanical behaviors of the respective covering layers are different. Also when a high tension is applied to optical fiber cable 10 and optical fiber cable 10 is subjected to a mechanical fatigue test, adhesion between the respective covering layers is lowered and the winding tendency of optical fiber cable 10 is less likely to be enhanced. Therefore, it is preferred that the elastic modulus of the respective covering layers do not differ too much. Preferably, a difference in elastic modulus between the covering layer having the highest flexural modulus and the covering layer having the lowest flexural modulus is 500 MPa or less, and more preferably 350 MPa or less.

Furthermore, it is preferred to mix a large amount of the flame retardant with the covering layer using a resin component having a low flexural modulus and mix a small amount of the flame retardant with the covering layer using a resin component having a high flexural modulus, thereby to reduce a difference in flexural modulus between the respective covering layers and to reduce the flexural modulus of entire optical fiber cable 10, thus improving the handling property.

Therefore, when the flame retardant is mixed with the material in optical fiber cable 10 comprising plural covering layers made of the material comprising the resin component containing the polyamide polymer, it is preferred that the content of the flame retardant in the material containing the resin component having the highest flexural modulus is the lowest as compared with the content of the flame retardant in the material containing the other resin component, and the content of the flame retardant in the material containing the resin component having the lowest flexural modulus is the highest as compared with the content of the flame retardant in the material containing the other resin component. Consequently, a difference in flexural modulus between the respective covering layers can be reduced and the flexural modulus of entire optical fiber cable 10 can also be reduced.

To further enhance the effect of improving the flame resistance of optical fiber cable 10, the covering layer formed as the outer-most layer of optical fiber cable 10 preferably contains the flame retardant, and more preferably the covering layer having the highest content of the flame retardant is formed as the outermost layer.

To impart appropriate rigidity and flexibility and to further improve the handling property upon during the assembly operation, it is preferred to take account of not only the flexural modulus of covering layer, but also the thickness of covering layer. When the optical fiber cable comprises n covering layers ($n \geq 2$) made of the material containing the resin component and a covering layer having a highest flexural modulus is formed as the kth layer from the inside of these covering layers, as shown in the following expression (1), it is preferred that the covering layer having a flexural modulus smaller than that of the covering layer having the highest flexural modulus (mth layer) is formed more outside than the covering layer having the highest flexural modulus (kth layer) and the product of the flexural modulus of the covering layer having the highest flexural modulus and the thickness of the covering layer is smaller than the product of the flexural modulus of the covering layer formed more outside and the thickness of the covering layer.

$$d_k \times E_k \leq d_m \times E_m \quad (1)$$

provided that $E_m \leq E_k$, where $E_k$ (MPa) denotes a flexural modulus of this covering layer, $d_k$ (μm) denotes a thickness, $E_m$ (MPa) denotes a flexural modulus of an arbitrary covering layer formed as the mth layer ($k<m \leq n$) from the inside of these covering layers, and $d_m$ (μm) denotes a thickness.

Furthermore, it is more preferred that the thickness of the covering layer (mth layer) formed more outside than the covering layer having the highest flexural modulus is increased as compared with the covering layer having the highest flexural modulus (kth layer) ($d_k \leq d_m$) and the flexural modulus is reduced to 1200 MPa or less as shown in the following equation (2):

$$E_m \leq 1200 \quad (2)$$

To improve the adhesion between the respective covering layers and to prevent the winding tendency of optical fiber cable 10, it is preferably designed so that the flexural modulus $E_x$ and the thickness $d_x$ of the covering layer having the highest elastic modulus and arbitrary covering layer, which is formed more outside than the covering layer and formed as the xth layer ($k<x \leq n$) from the inside, meet the following expressions (3) and (4), that is, the modulus of the covering layer decreases gradually toward the outside and the product of the flexural modulus and the thickness of the respective covering layers.

$$E_x \leq E_{x-1} \quad (3)$$

$$d_{x-1} \times E_{x-1} \leq d_x \times E_x \quad (4)$$

where $E_1, \ldots, E_n$ denote flexural modulus of n covering layer ($n \geq 2$) made of the material containing the resin component in order from the inside, $d_1, \ldots, d_n$ denote thicknesses in order from the inside, $E_x$ denotes a flexural modulus of an arbitrary covering layer formed as the xth layer ($k<x \leq n$) from the inside, and $d_x$ denotes a thickness.

More preferably, a difference in flexural modulus between adjacent covering layers is 350 MPa or less, as shown in the following expression (5):

$$E_{x-1} \leq E_x + 350 \quad (5).$$

To impart the flexibility and appropriate form stability to optical fiber cable 10, it is preferred to form three or more covering layers and to form a covering layer having the highest flexural modulus between the outermost covering layer and innermost covering layer. In this case, to improve the adhesion between the respective covering layers and the adhesion between the covering layer formed most inside and optical fiber cable 12 and to prevent the winding tendency of optical fiber cable 10, covering layers are preferably formed so that the flexural modulus is gradually reduced from the covering layer having the highest flexural modulus to the covering layer inside thereof as shown in the following expression (6):

$$E_{y-1} \leq E_y \quad (6)$$

provided that ($1 \leq y \leq k$).

A difference in flexural modulus between adjacent covering layers is preferably set to 350 MPa or less, as shown in the expression (7):

$$E_y \leq E_{y-1} + 350 \quad (7).$$

In preferred form of optical fiber cable 10 of the present invention, as shown in FIG. 2, three covering layers of first covering layer 13, second covering layer 14 and tertiary covering layer 15 are formed on the outer periphery of optical fiber 12 and all three covering layers are made of the material comprising the polyamide polymer. Furthermore, most preferred is an optical fiber which meets the following expressions (8) and (9):

$$d_1 \times E_1 + d_2 \times E_2 \leq d_3 \times E_3 \quad (8)$$

$$d_1 + d_2 \leq d_3 \quad (9)$$

where $E_1$, $E_2$ and $E_3$ denote flexural modulus of covering layer in order from the inside and $d_1$, $d_2$ and $d_3$ denote thickness in order from the inside.

That is, the thickness of tertiary covering layer 15 is preferably larger than the total thickness of primary covering layer 13 and secondary covering layer 14. When the thickness of tertiary covering layer 15 is smaller than the total thickness of the primary covering layer 13 and the secondary covering layer 14, the flexibility is likely to be impaired because the flexural modulus of entire optical fiber cable 10 increases. When the material constituting tertiary covering layer 15 is mixed with colorant for discrimination, the color developability thereof is sometimes lowered.

The sum total of the product of the flexural modulus of primary covering layer 13 and the thickness of the covering layer and product of the flexural modulus of secondary covering layer 14 and the thickness of the covering layer is preferably larger than the product of the flexural modulus of tertiary covering layer 15 and the thickness of covering layer. Consequently, winding tendency is less likely to be imparted as compared with a conventional multi-layer cable covered with polyamide and optical fiber 10 having both appropriate rigidity and flexibility as well as excellent handling property can be obtained.

Particularly preferably, primary covering layer 13 has a thickness of 200 μm or less. When the thickness of primary covering layer 13 exceeds 200 μm, the covering layer having higher rigidity than that of optical fiber 12 becomes impossible to conform with deformation of optical fiber 12, and thus optical fiber 12 is likely to be drastically damaged by bending fatigue and optical properties are lowered.

It is preferred that the innermost primary covering layer 13 physically protects optical fiber 12 from an influence of an outer force and, at the same time, the use of a polyamide polymer having excellent environmental resistance as the material inhibits a harmful substance from transferring to optical fiber 12. Therefore, it is preferred that dyes, pigments and flame retardants for discrimination of optical fiber cable 10 are not mixed to the utmost and auxiliaries for prevention of external light are only mixed with optical fiber 12. The polyamide polymer used in primary covering layer 13 is preferably a comparatively flexible polyamide polymer such as polyamide 11, which is superior in adhesion with optical fiber 12 and is conformable with deformation of optical fiber 12, and is also superior in fatigue resistance.

Since secondary covering layer 14 has a function of imparting appropriate form stability to the entire optical fiber cable 10, thereby to improve the operability of optical fiber cable 10, the flexural modulus is preferably increased rather than primary covering layer 13 and tertiary covering layer 15 as the outermost layer by using the polyamide polymer having a comparatively large flexural modulus. If necessary, the flame resistance may be enhanced by mixing flame retardants.

Tertiary covering layer 15 is a very important covering layer for reconciling the desired flame-resistant effect of the present invention and the flexibility of optical fiber cable 10. As described above, colorants such as dyes and pigments as well as flame retardants are often mixed with the outermost layer having the highest imparting effect in order to impart the discrimination property and the flame resistance to optical fiber cable 10. However, the resin component containing these additives added therein has a higher rigidity than that of the polyamide polymer containing no additives and, as a result, the flexibility of optical fiber cable 10 itself is impaired. Therefore, a flexible polyamide polymer is selected as the main component and the final flexural modulus of the covering layer after mixing with the colorant and flame retardant is preferably adjusted to 1200 MPa or less, more preferably 1000 MPa or less, and most preferably 800 MPa or less.

Specific example of the polyamide polymer used in the three covering layers is preferably polyamide 11 for primary covering layer 13, and is preferably polyamide 12 for secondary covering layer 14. For tertiary covering layer 15 or the outermost layer, a polyamide elastomer or a polyamide copolymer such as polyamide 612 as well as a flame retardant is used.

In optical fiber cable 10, the total amount of the flame retardant in the covering layer is preferably within a range from 5 to 80% by weight. When the amount is less than 5% by weight based on the total weight of the covering layer, sufficient flame resistance is not imparted sometimes. Even if the amount exceeds 80% by weight, an increase in flame-resistant effect to an increase in amount is reduced and the handling property is likely to be lowered because the weight of optical fiber cable 10 increases. When the amount of the flame retardant is within such a range, a small amount of the flame retardant makes it possible to effectively impart the flame resistance and to maintain the flexural modulus of entire optical fiber cable 10 at a low level by mixing the flame retardant with only the material constituting the outermost layer and using a polyamide polymer having a low flexural modulus. For example, it is possible to impart the flame resistance, which passes DIN 72551-5, to the optical fiber cable by using a polyamide polymer containing polyamide 11 or polyamide 12 as the main component used in each covering layer and adding the flame retardant to only the outermost layer.

Optical fiber cable 10 of the present invention can be produced by covering optical fiber 12 with the material containing the resin component using a cross-head type covering apparatus. When plural covering layers are formed, the covering layer may be formed one by one, or plural covering layers may be simultaneously formed. When the number of the covering layers is too large, it tends to be difficult to produce the optical fiber cable. Therefore, the number of the covering layers is preferably 3 or less.

When using a colored resin in the outermost layer to discriminate optical fiber cable 10 by the appearance, incidence of external light into optical fiber 12 by forming a covering layer using a black resin inside. Although publicly known colorants are used, the colorant such as dye may be transferred to optical fiber 12 at high temperature, thereby to increase a transmission loss, and therefore inorganic pigments are preferably used.

The optical fiber cable with a plug of the present invention is produced by connecting a plug with at least one end of optical fiber cable 10. The plug can be used after selecting from publicly known plugs depending on the purpose. A mechanism to fix the plug to optical fiber cable 10 is, for example, a caulking mechanism. A plug portion having a high mechanical strength is preferably used.

EXAMPLES

The present invention will be explained by way of Examples, but the scope of the present invention is not limited to these Examples.

Various measuring procedures in the Examples will be explained.

Flexural modulus of the resin component containing a polyamide polymer used in these Examples are shown in Table 1.

(Flame Resistance)

The flame resistance was determined by the above-described measuring procedure in accordance with DIN 72551-5.

(Flexural Modulus of Optical Fiber Cable)

Optical fiber cable 10 was fixed at two fixed points and optical fiber 12 was pressed vertically to a central axis using a cable bending jig. A distance between the fixed points was set to 15 mm. Upon pressing, optical fiber cable 10 was in the form of a circular arc having a radius of curvature of 5 mm. A stress (N) applied to the cable bending jig was measured when the displacement of the cable bending jig became 1 mm after the beginning of pressing. The flexural modulus (N/mm) was calculated.

(Flexural Modulus of Covering Layer and Resin Component)

The flexural modulus was measured in accordance with ASTM D790.

Example 1

Using a methyl methacrylate homopolymer having a refractive index of 1.490 as a core material of optical fiber 12, a copolymer having a refractive index of 1.417, comprising 45% by weight of a 2,2,2-trifluoroethyl methacrylate unit, 35% by weight of a 1,1,2,2-tetrahydroperfluorodecyl methacrylate unit, 19% by weight of a methyl methacrylate unit and 1% by weight of a methacrylic acid unit as a clad material, and a copolymer having a refractive index 1.402, comprising 80% by mol of a fluorinated vinylidene unit and 20% by mol of a tetrafluoroethylene unit as a material of a protective layer, optical fiber 12 having a diameter of core 11A of 980 µm, a diameter of clad 11B of 10 µm and a thickness of a protective layer of 10 µm was produced.

Figure 3:
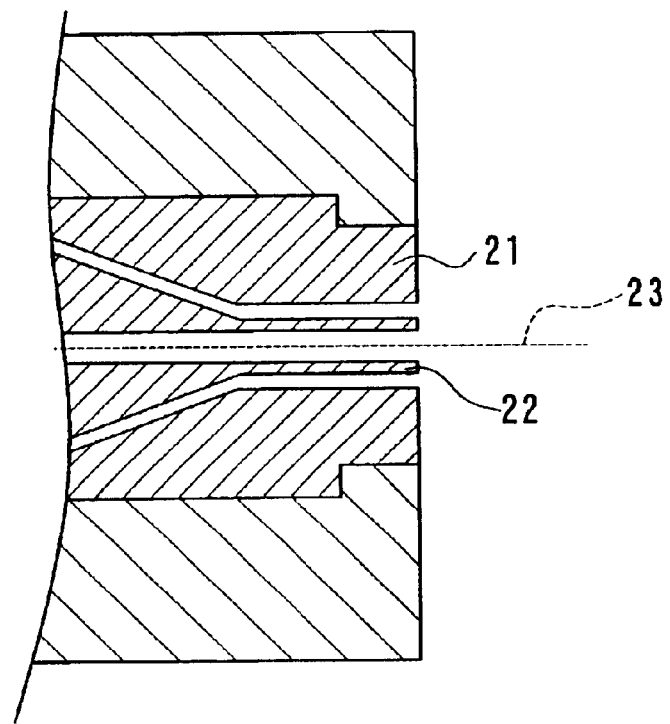
FIG. 3 is a longitudinal sectional view showing the principal portion of a covering apparatus used in Examples.

Using two screw extruders, two-layer composite type cross-head die and a spinneret, the outer periphery of optical fiber 12 was covered simultaneously with primary covering layer 13 and secondary covering layer 14 to obtain optical fiber cable 10 having an outer diameter of 2.3 mm. As shown in FIG. 3, a principal portion of a covering apparatus used is composed of die 21 and nipple 22 assembled therein, while a tip surface of die 21 and tip of nipple 22 are located in the same plane. The symbol 23 is an axis of optical fiber 12, which passes through the center of nipple 22. The covering temperature was set to 200° C.

The thickness of primary covering layer 13 of this optical fiber cable 10 was 255 µm, and the thickness of secondary covering layer 14 was 395 µm. Polyamide 12 containing 0.5% by weight of carbon black and 1.0% by weight of maleic anhydride ("DAIAMID-L1640", manufactured by DAICELHULS LTD., hereinafter merely referred to as "PA12") was used as primary covering layer 13, while a mixture of 100 parts by weight of a polyamide elastomer comprising 12 units of polyamide having a flexural modulus measured in accordance with ASTM D790 of 340 MPa and a polyether unit ("DAIAMID PAE-E62", manufactured by DAICELHULS LTD.) and 15 parts by weight of melamine cyanurate was used as secondary covering layer 14.

The flexural modulus measured in accordance with ASTM D790 of primary covering layer 13 was 1300 MPa, and the flexural modulus of secondary covering layer 14 was 620 MPa. The flexural modulus and the flame resistance of the resulting optical fiber cable 10 were measured.

The flexural modulus and the thickness of each layer, the product thereof, and the results of the flexural modulus test and the flame resistance test in optical fiber cable 10 are shown in Table 2 to Table 3.

Examples 2 to 9 and Comparative Examples 1 to 3

In the same manner as in Example 1, except that primary covering layer 13 and secondary covering layer 14 were changed as shown in Table 2, 0.5% by weight of carbon black was added to primary covering layer 13, and maleic anhydride was not added, optical fiber cables 10 were obtained. The flexural modulus and the thickness of each layer, the product thereof, and the results of the flexural modulus test and the flame resistance test in optical fiber cables 10 are shown in Table 2 to Table 3.

Example 10

Optical fiber 12 obtained in the same manner as in Example 1 was put in a hot-air oven before covering and subjected to a batch-wise heat treatment at 90° C. for 65 hours. A thermal shrinkage ratio under dry-heating at 90° C. for 50 hours of optical fiber 12 was 0.1%. In the same manner as in Example 1, except that this optical fiber 12 was covered with the respective covering layers, for example, polyamide 12 mixed with 0.5% by weight of carbon black as primary covering layer 13, polyamide 11 mixed with 0.5% by weight of carbon black as secondary covering layer 14 and the material used as secondary covering layer 14 of Example 2 as tertiary covering layer 15, using a screw extruder, a single-layer type cross-head die and a spinneret, optical fiber cable 10 was obtained. The thickness of primary covering layer 13 was 100 µm.

With respect to the resulting optical fiber cable 10, a peel strength between optical fiber 12 and primary covering layer 13 was measured.

Figure 4:
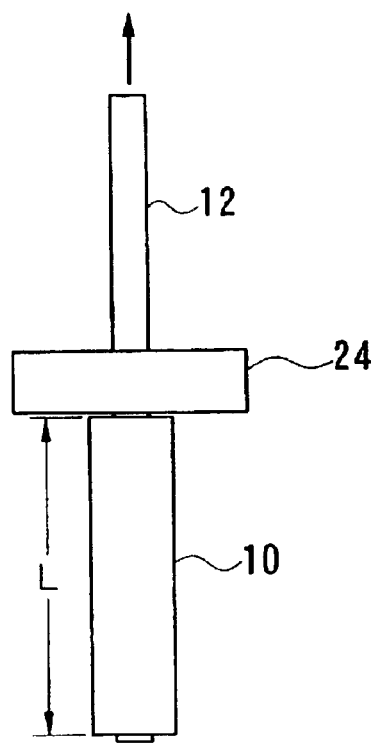
FIG. 4 is a side view showing a measuring procedure of a peel strength in Examples.

The peel strength was measured as shown in FIG. 4. First, there was prepared optical fiber cable 10 wherein primary covering layer 13, secondary covering layer 14 and tertiary covering layer 15 were peeled off at one end side and were not peeled off at the other end side, and the length L of the covering portion is 30 mm. After the covering portion of optical fiber cable 10 was fixed using fixture 24 and the peeled portion of the covering layer, that is, the portion wherein optical fiber 12 is exposed was fixed to a withdrawing apparatus having a mechanism capable of measuring a stress (not shown), optical fiber 12 was withdrawn at a constant rate 100 mm/min toward the direction along with the central axis (direction of the arrow in the drawing). From a curve showing plots of the withdrawing stress versus the shift amount of the covering layer of optical fiber 12 in the withdrawing direction, a peak value of the stress upon withdrawing was read and this peak value was taken as a measured value. The peel strength of optical fiber 12 and primary covering layer 13 was measured by using optical fiber cable 10 after peeling off secondary covering layer 14 and tertiary covering layer 15.

After cutting both ends of the resulting optical fiber cable 10 using a razor, a cycle of maintaining at −40° C. for 30 minutes, heating to 85° C. over 10 minutes, maintaining at the same temperature for 30 minutes, cooling to 20° C. over 10 minutes, maintaining at the same temperature for 30 minutes, cooling to −40° C. over 10 minutes, and maintaining at the same temperature for 30 minutes was repeated 10 times. Then, the shape of optical fiber 12 in the cut end was observed. However, any change in shape was not observed.

Constitution and various measuring results of optical fiber cable 10 are summarized in Table 4 to Table 6.

Examples 11 to 13

In the same manner as in Example 10, except that the covering material was changed as shown in Table 4, optical fiber cables 10 were produced. In the same manner as in Example 10, primary covering layer 13 and secondary covering layer 14 contain 0.5% by weight of carbon black. In addition, constitution and various measuring results of optical fiber cables 10 are summarized in Table 4 to Table 6.

With respect to these cables, the shape of the end of optical fiber 12 was observed after the temperature cycle in the same manner as in Example 10. However, any change was not observed, like Example 10.

Example 14

With respect to optical fiber cable 10 obtained in Example 10, the following evaluation was made, and then optical properties and environmental resistance were evaluated. Constitution and evaluation results of optical fiber cable 10 are shown in Table 7.

As a result, it became clear that all properties are good and this optical fiber cable 10 is superior in reliability under the environment of high temperature and high humidity.

Also optical fiber cable 10 has both appropriate elasticity and flexibility and is less likely to exhibit wiring tendency, and is also markedly superior in handling property. Furthermore, the outermost layer was colored yellow, orange, green and blue. As a result, the color developability was good and the discrimination property was excellent.
(Transmission Loss)

The transmission loss (dB/km) was measured at a wavelength of 650 nm and a launch NA of 0.1 according to the 25 m-5 m cut-back method.
(Evaluation of Cable Shrinkage Ratio)

A cable having a sample length of 50 cm obtained by being subjected to a polishing treatment in a oven at 90° C. for 24 hours while lining up the covering layer and the optical fiber of both ends. The length L (cm) of optical fiber cable 10 after the heat treatment was measured and the cable shrinkage ratio (%) was measured in accordance with the following equation:

Cable shrinkage ratio (%)=(50−L)/50×100

(Wet Heat Evaluation)

A difference in transmission loss (dB/km) before and after the treatment under a wet heat environment at 85° C. and 95% for 1000 hours was measured.
(Number of Repeated Bending)

Figure 5:
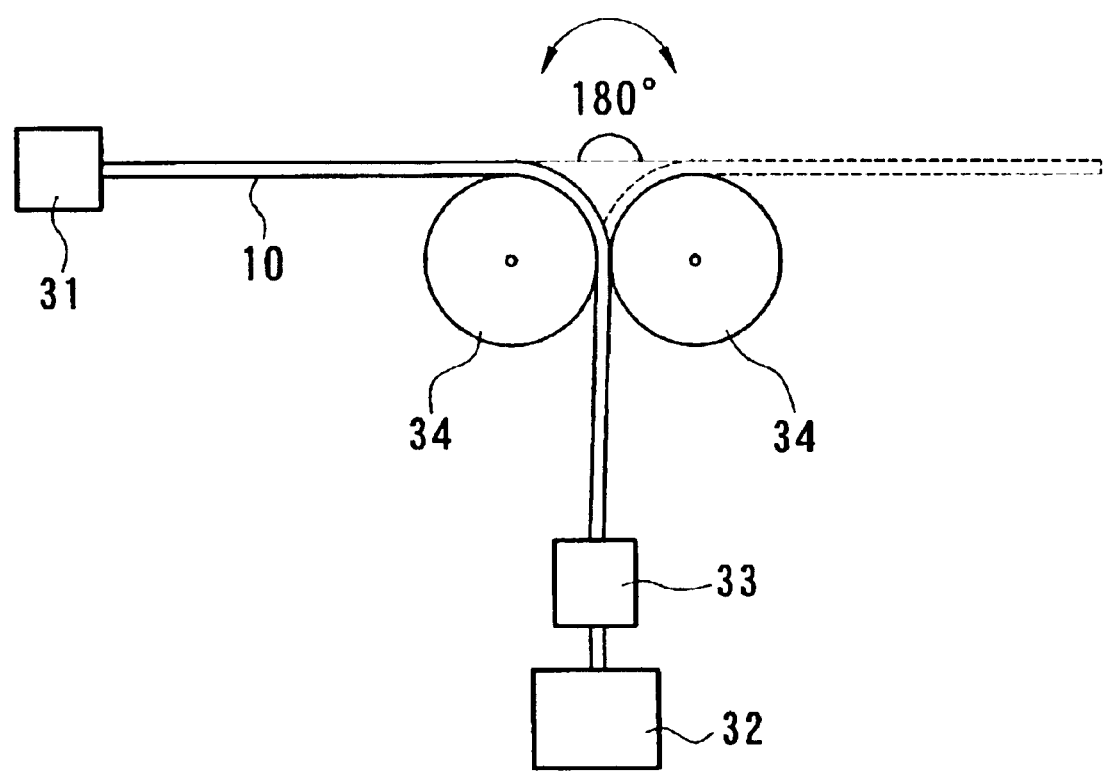
FIG. 5 is a side view showing a measuring procedure of a bending test in Examples.

As shown in FIG. 5, a load was applied by connecting 500 g of weight 33 to the end at the side of power meter 32 of optical fiber cable 10 having a length of 4 m wherein LED (emission wavelength: 660 nm) 31 was connected to one end and optical power meter 32 was connected to the other end, and the center of the optical fiber cable was interposed between two cylindrical supporting bars 34 each having a diameter of 15 mm. Then, the LED side of optical fiber cable 10 was subjected to 180° repeatedly moving as shown in the drawing by the arrow. In this case, optical fiber cable 10 was brought into contact with each supporting bar at a contact angle of 900°.

In such a manner, the number of bends was measured when the quantity of light outgoing from optical fiber cable 10 measured by the optical power meter was reduced by 1 dB as compared with that before the test.

Examples 15 to 17

In the same manner as in Example 10, except that the clad material, the protective material and the covering material of the fiber were changed as shown in Table 7, optical fiber cables 10 were produced. The test results of the cable property are also shown in Table 7. All optical fiber cables 10 exhibited good environmental resistance and high handling property. In the optical fiber cable of Example 15 wherein a difference in flexural modulus of the covering layer is small, bending properties were further improved and any space between secondary covering layer 14 and tertiary covering layer 15 of optical fiber cable 10 after the bending was not observed and good shape was maintained.

Abbreviations used in the tables are shown below.

PA11: polyamide 11 (manufactured by ATOFINA JAPAN, "RILSAN BMN O")
PA12: polyamide 12 (manufactured by DAICELHULS LTD., "DAIAMID-L1640")
PAE ①: polyamide elastomer (manufactured by DAICEL-HULS LTD., "DAIAMID PAE-E62")
PAE ②: polyamide elastomer (manufactured by DAICEL-HULS LTD., "DAIAMID PAE-E47")
PA612: polyamide 612 (manufactured by DAICELHULS LTD., "DAIAMID N-1901")
PA66612: polyamide 66612 (manufactured by DAICEL-HULS LTD., "VESTAMELT 171")
MEPR: melamine acid graft ethylenepropylene rubber
VdF: vinylidene fluoride
TFE: tetrafluoroethylene
HFP: hexafluoropropylene

TABLE 1

| Resin component | Flexural modulus (MPa) |
|---|---|
| PA11 | 1000 |
| PA12 | 1300 |
| PAE ① | 340 |
| PAE ② | 130 |
| PA12/PAE ② | 680 |
| PA12/PA612 | 760 |
| PA12/MEPR | 600 |
| PA612 | 490 |
| PA11/PA66612 = 50/50 | 740 |
| PA12/PA66612 = 25/75 | 700 |
| PA11/PA12 = 50/50 | 1160 |

In the following tables, all flame retardants are melamine cyanurates and units of numerical values are parts by weight based on 100 parts by weight of the resin component.

TABLE 2

| | Primary covering layer | | Secondary covering layer | | Evaluation of cable | |
|---|---|---|---|---|---|---|
| | Resin composition | Flame retardant | Resin composition | Flame retardant | Flexural modulus (N/mm) | Flame resistance test |
| Example 1 | PA12 | — | PAE ① | 15 | 9 | pass |
| Example 2 | PA12 | — | PA12/PAE ② = 50/50 | 15 | 9 | pass |
| Example 3 | PA12 | — | PA12/PA612 = 50/50 | 25 | 10 | pass |
| Example 4 | PA12 | — | PA12/MEPR = 50/50 | 35 | 6 | pass |
| Example 5 | PA12 | 15 | PAE ① | 15 | 14 | pass |
| Example 6 | PAE ① | 35 | PAE ① | 15 | 7 | pass |
| Example 7 | PA12 | — | PAE ① | 15 | 8 | pass |
| Example 8 | PA11 | — | PAE ① | 15 | 7 | pass |
| Example 9 | PA11 | — | PA612 | 15 | 8 | pass |
| Comparative Example 1 | PA12 | — | PA12 | — | 17 | failed |

TABLE 2-continued

| | Primary covering layer | | Secondary covering layer | | Evaluation of cable | |
|---|---|---|---|---|---|---|
| | Resin composition | Flame retardant | Resin composition | Flame retardant | Flexural modulus (N/mm) | Flame resistance test |
| Comparative Example 2 | PA12 | 3 | PA12 | 3 | 20 | pass |
| Comparative Example 3 | PA12 | — | PA12 | 15 | 23 | pass |

TABLE 3

| | Primary covering layer | | | Secondary covering layer | | |
|---|---|---|---|---|---|---|
| | Flexural modulus of covering layer (MPa) | Thickness (μm) | (Flexural modulus of covering layer) × (thickness of covering layer) (MPa·μm) | Flexural modulus of covering layer (MPa) | Thickness (μm) | (Flexural modulus of covering layer) × (thickness of covering layer) (MPa·μm) |
| Example 1 | 1300 | 255 | 331500 | 620 | 395 | 244900 |
| Example 2 | 1300 | 255 | 331500 | 1000 | 395 | 395000 |
| Example 3 | 1300 | 255 | 331500 | 1200 | 395 | 474000 |
| Example 4 | 1300 | 255 | 331500 | 1100 | 395 | 434500 |
| Example 5 | 1550 | 255 | 395250 | 620 | 395 | 244900 |
| Example 6 | 1000 | 255 | 255000 | 620 | 395 | 244900 |
| Example 7 | 1300 | 255 | 331500 | 620 | 255 | 244900 |
| Example 8 | 1000 | 255 | 255000 | 620 | 395 | 244900 |
| Example 9 | 1000 | 255 | 255000 | 780 | 395 | 308100 |
| Comparative Example 1 | 1300 | 255 | 331500 | 1200 | 395 | 474000 |
| Comparative Example 2 | 1350 | 255 | 344250 | 1260 | 395 | 497700 |
| Comparative Example 3 | 1300 | 255 | 331500 | 1460 | 395 | 576700 |

TABLE 4

| | Primary covering layer | | Secondary covering layer | | Tertiary covering layer | |
|---|---|---|---|---|---|---|
| | Resin composition | Flame retardant | Resin composition | Flame retardant | Resin composition | Flame retardant |
| Example 10 | PA12 | — | PA11 | — | PA12/PAE ② = 50/50 | 15 |
| Example 11 | PA11 | — | PA12 | — | PA12/PAE ② = 50/50 | 15 |
| Example 12 | PA11/PA66612 = 50/50 | — | PA12 | — | PA612 | 15 |
| Example 13 | PA12/PA66612 = 25/75 | — | PA11/PA12 = 50/50 | — | PA612 | 20 |

TABLE 5

| | Primary covering layer | | | Secondary covering layer | | | Tertiary covering layer | | |
|---|---|---|---|---|---|---|---|---|---|
| | Flexural modulus of covering layer (MPa) | Thickness (μm) | (Flexural modulus of covering layer) × (thickness of covering layer) (MPa·μm) | Flexural modulus of covering layer (MPa) | Thickness (μm) | (Flexural modulus of covering layer) × (thickness of covering layer) (MPa·μm) | Flexural modulus of covering layer (MPa) | Thickness (μm) | (Flexural modulus of covering layer) × (thickness of covering layer) (MPa·μm) |
| Example 10 | 1300 | 100 | 130000 | 1000 | 255 | 255000 | 1000 | 395 | 395000 |
| Example 11 | 1000 | 100 | 100000 | 1300 | 150 | 195000 | 1000 | 395 | 395000 |
| Example 12 | 800 | 50 | 40000 | 1300 | 200 | 260000 | 780 | 350 | 273000 |
| Example 13 | 750 | 75 | 56250 | 1300 | 175 | 210000 | 860 | 350 | 301000 |

TABLE 6

| | Evaluation of cable | | |
|---|---|---|---|
| | Flexural modulus (N/mm) | Flame resistance test | Peel strength of optical fiber and primary covering layer (N) |
| Example 10 | 7 | pass | 30.5 |
| Example 11 | 7 | pass | 30.2 |
| Example 12 | 6 | pass | 37.1 |
| Example 13 | 7 | pass | 33.2 |

TABLE 7

| | Constitution of cable | | | Evaluation of cable | | | | | |
|---|---|---|---|---|---|---|---|---|---|
| | Clad material | Protective layer | Constitution of covering layer | Transmission loss (dB/km) | Wet heat evaluation (dB/km) | Cable shrinkage ration (%) | Number of repeated bending | handling property | Peel strength of optical fiber and primary covering layer (N) |
| Example 14 | Using cable of Example 10 | | | 128 | 24 | 0.06 | 25000 | markedly good | 30.5 |
| Example 15 | the same as in Example 10 | | the same constitution as in Example 11 | 127 | 22 | 0.06 | 28000 | markedly good | 30.2 |
| Example 16 | (A) | (C) | the same constitution as in Example 10 | 186 | 20 | 0.10 | 19000 | markedly good | 29.9 |
| Example 17 | (B) | (C) | the same constitution as in Example 10 | 132 | 36 | 0.12 | 21000 | markedly good | 30.7 |

(A): methyl α-fluoroacrylate/α-fluoroacrylic acid-2,2,2-trifluoroethyl copolymer (10/90 (mol %))
(B): VdF/TFE/HFP copolymer (70/20/10 (mol %))
(C): VdF/TFE copolymer (80/20 (mol %))

As described above, the optical fiber cable of this Example had high flame resistance and was also superior in handling property.

INDUSTRIAL APPLICABILITY

As explained above, since the optical fiber cable of the present invention comprises an optical fiber and at least one covering layer formed on the outer periphery of the optical fiber, at least one layer of the covering layer being made of a material comprising a resin component containing a polyamide polymer, wherein a flexural modulus E upon displacement of 1 mm is within a range from 2 to 15 (N/mm) and the optical fiber cable passes a flame resistance test in accordance with DIN 72551-5, the optical fiber cable has excellent flame resistance and good handling property. Therefore, the optical fiber cable is suited for use in wiring of transmission of light signals, computer connection wiring for high-speed optical communication, wiring in the vicinity of switchboards, wiring for controlling automatic machines of factories, wiring for transmitting data for moving bodies such as automobile, and wiring for optical sensors.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An optical fiber cable comprising:
   optical fiber; and
   at least two covering layers formed on the outer periphery of the optical fiber;
   wherein the at least two covering layers are made of materials comprising a resin component containing a polyamide polymer,
   a difference in flexural modulus between the covering layer having the highest flexural modulus and a covering layer having the lowest flexural modulus, among the at least two covering layers, is 500 MPa or less, and
   at least one of the layers among the at least two covering layers, contains a flame retardant, and
   the content of flame retardant in the material containing the resin component having the highest flexural modulus is less than the content of the flame retardant in the material containing the other resin component among the at least two covering layers.

2. An optical fiber cable according to claim 1, wherein the flexural modulus of the resin component as measured in accordance with ASTM D790 is within a range from 40 to 1200 MPa.

3. An optical fiber cable according to claim 1, wherein the polyamide polymer is a polyamide elastomer.

4. An optical fiber cable according to claim 1, wherein the polyamide polymer is a polyamide copolymer composed of plural kinds of polyamide units.

5. An optical fiber cable according to claim 1, wherein the resin component further contains a polyolefin.

6. An optical fiber cable according to claim 1, wherein the flame retardant contains a triazine compound and the content of the triazine compound is within a lunge from 8 to 60 parts by weight based on 100 parts by weight of the resin component.

7. An optical fiber cable according to claim 1, wherein an outer diameter of the optical fiber is within a range from 600 to 1300 µm and an outer diameter of the optical fiber cable is within a range from 1500 to 6000 µm.

8. An optical fiber cable according to claim 1, wherein, among materials which constitute the at least two covering layers, the content of the flame retardant in the material containing the resin component having a lower flexural modulus is greater than the content of the flame retardant in the material containing the other resin component.

9. An optical fiber cable according to claim 1, wherein, among at least two covering layers, the covering layer made of the material having a highest content of the flame retardant is formed as the outermost layer.

10. An optical fiber cable according to claim 1, comprising n covering layers (n≧2) made of the material containing the resin component, a covering layer having a highest flexural modulus being formed as the kth layer from the inside of these covering layers, wherein the optical fiber cable meets the following expression (1):

$$d_k \times E_k \leq d_m \times E_m \quad (1)$$

provided that $E_m \leq E_k$, where $E_k$ (MPa) denotes a flexural modulus of kth covering layer, $d_k$ (µm) denotes a thickness thereof; $E_m$ (MPa) denotes a flexural modulus of an arbitrary covering layer formed as the mth layer (k<m≦n) from the inside of these covering layers, and $d_m$ (µm) denotes a thickness thereof.

11. An optical fiber cable according to claim 10, which meets the following expression (2):

$$E_m \leq 1200 \quad (2)$$

provided that $d_k \leq d_m$.

12. An optical fiber cable according to claim 10, which meets the following expressions (3) and (4):

$$E_x \leq E_{x-1} \quad (3)$$

$$d_{x-1} \times E_{x-1} \leq d_x \times E_x \quad (4)$$

where $E_1, \ldots, E_x$ denote flexural modulus of n covering layer (n ≧2) made of the material containing the resin component in order from the inside respectively, $d_1, \ldots, d_n$ denote thicknesses thereof in order from the inside respectively $E_x$ denotes a flexural modulus of an arbitrary covering layer form as the kth layer (k<x≦n) from the inside, and $d_x$ denotes a thickness thereof.

13. An optical fiber cable according to claim 12, which meets the following expression (5):

$$E_{x-1} \leq E_x + 350 \quad (5).$$

14. An optical fiber cable according to claim 10, which meets the following expression (6):

$$E_{y-1} \leq E_y \quad (6)$$

where n≧3 and $E_y$ denotes a flexural modulus of an arbitrary covering layer formed as the yth layer(1≦y≦k, provided that 1<k<n)from the inside of these covering layers.

15. An optical fiber cable according to claim 14, which meets the following expression(7):

$$E_y \leq E_{y-1} + 350 \quad (7).$$

16. An optical fiber cable comprising:

an optical fiber; and a cover layer formed on the outer periphery of the optical fiber, said cover layer comprising at less three covering layers, wherein said at least three covering layers are made of materials comprising a resin component containing a polyamide polymer, a difference in flexural modulus between a covering layer having the highest flexural modulus and a covering layer having the lowest flexural modulus, among the three covering layers is not more than 500 MPa, and the materials that constitutes at least one layer among the three covering layers further comprises a flame retardant, and the three covering layers satisfy the following expressions (8) and (9):

$$d_1 \times E_1 + d_2 \times E_2 \leq d_3 \times E_3 \quad (8)$$

$$d_1 + d_2 \leq d_3 \quad (9)$$

wherein $E_1$, $E_2$ and $E_3$ denote flexural modulus of the covering layers in order from the inside respectively and $d_1$, $d_2$ and $d_3$ denote thickness of the covering layers in-order from the inside respectively.

17. An optical fiber cable according to claim 1, wherein the amount of the flame retardant in all covering layers is within a range from 5 to 80% by weight.

18. An optical fiber cable according to claim 1, wherein the flame retardant is a triazine compound.

19. An optical fiber cable according to claim 1, wherein a covering layer made of the material comprising the resin component containing polyamide 12 as the polyamide polymer, and a covering layer comprising the resin component containing a polyamide copolymer as the polyamide polymer and a flame retardant are formed in order from the inside.

20. An optical fiber cable according to claim 19, wherein the covering layer made of the material comprising a resin component containing polyamide 11 as the polyamide polymer is formed more inside than the covering layer comprising the resin component containing the polyamide 12 as the polyamide polymer.

21. An optical fiber cable with a plug, comprising the optical fiber cable of claim 1 and a plug connected with at least one end of the optical fiber cable.

22. An optical fiber cable according to claim 1, wherein a flexural modulus $E_x$ upon displacement of 1 mm, is within a range from 2 to 15 (N/mm) and the optical fiber cable passes a flame resistance test in accordance with DIN 72551-5.

23. An optical fiber cable according to claim 22, wherein the flexural modulus of the resin component as measured in accordance with ASTM D790 is within a range from 40 to 1200 MPa.

* * * * *